B. M. W. HANSON.
YIELDABLE GEARING.
APPLICATION FILED JAN. 10, 1916.

1,217,760.

Patented Feb. 27, 1917.

Inventor:
B. M. W. Hanson,
By Hugh Sutherland
Atty.

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

YIELDABLE GEARING.

1,217,760.          Specification of Letters Patent.          Patented Feb. 27, 1917.

Application filed January 10, 1916. Serial No. 71,318.

*To all whom it may concern:*

Be it known that I, BENGT M. W. HANSON, a citizen of the United States, residing at Hartford, in the county of Hartford and State of Connecticut, have invented certain new and useful Improvements in Yieldable Gearing, of which the following is a specification.

This invention relates to what I shall for convenience term "yieldable gearing." Gearing involving the invention is susceptible of general use, although it is of especial utility when employed in connection with a spindle, such as the live spindle of a lathe, being adapted in this particular use to eliminate the presence of chatter marks on the work.

In the drawings accompanying and forming part of the present specification I have shown in detail one convenient form of embodiment of the invention which to enable those skilled in the art to practice the same will be set forth fully in the following description. I do not restrict myself to this disclosure; I may depart therefrom in several respects within the scope of the invention defined by the claims following said description.

Referring to said drawings.

Like characters refer to like parts throughout both views.

Figure 1:
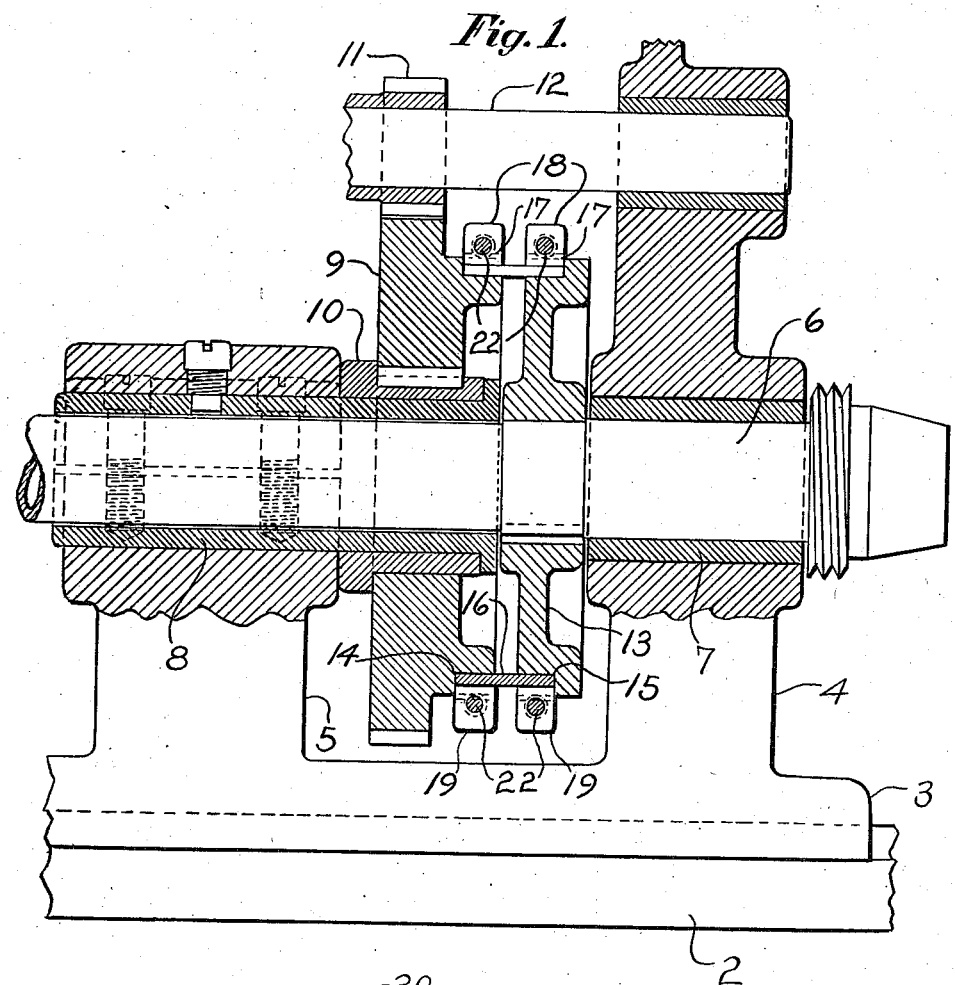
Figure 1 is a front elevation partly in section of the head-stock portion of a lathe embodying the invention.
Figure 2:
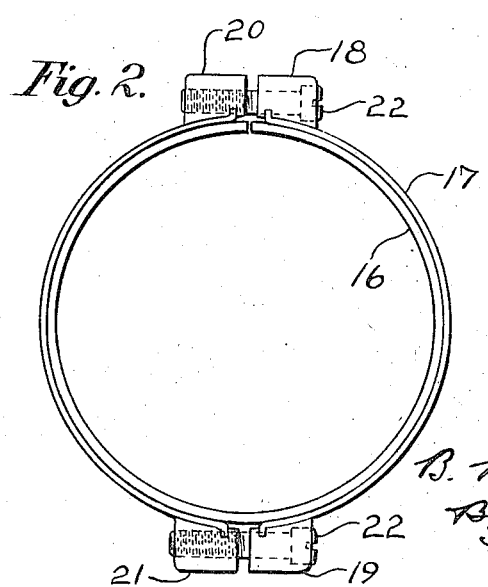
Fig. 2 is an elevation as seen from the right in Fig. 1, of a shock absorbing band and its adjuncts.

As recognized by those familiar with gear driven lathes, the live spindle is generally equipped with a driven gear usually in the form of a spur gear, rotated by a companion gear in mesh therewith, the companion gear, when the driven gear is of spur form, consisting of a pinion. Owing to the fact that the drive of the live spindle is obtained through meshing gears, the work shows chatter marks, the latter progressively increasing as the backlash between the gears increases. It is the fundamental object to provide means by which these marks will not show on the work, the consequence being that by virtue of the invention I can obtain a higher grade of product, the surface when dressed or turned being free of protrusions.

As may be inferred I do not restrict myself to any particular means whereby this important result can be obtained, although in the drawings I show an organization excellently adapted to insure the necessary function.

In Fig. 1 the numeral 2 denotes the bed or base and 3 a head-stock. The head-stock 3 is furnished with bearings 4 and 5 which jointly support the live spindle 6 for rotation, the live spindle being provided with the necessary accessories such as a face plate, and a driver dog, neither of which, however, is shown. The spindle 6 turns in the bushings 7 and 8 fitting the bearings 4 and 5 respectively, the driven gear 9 being supported by the live spindle but not directly carried thereby, being shown as keyed to the sleeve 10 which is loose on the bushing 8. From this it will be clear that the gear 9 is loose with respect to the live spindle, the two being capable of relative rotation. As a means for rotating the spur gear 10 the pinion 11 may be utilized, said pinion being carried by the shaft 12. It will be clear that on the rotation of the pinion 11 the spur gear 9 will be rotated.

In the present case the effect of the driven gear 9 which constitutes a driver for the spindle 6 is transferred to the latter through shock absorbing means, which may for instance consist of a pad of approximately annular form as will hereinafter appear, the shock absorbing means taking up the shock of the gear 9 so that the motion of the latter will be transferred to the spindle 6 in a uniform, even and smooth manner. I prefer that the said pad or equivalent member of whatever nature it may be shall have a non-slip connection with the live spindle I have shown as rotative with the spindle 6 the disk 13. Said disk may as shown be keyed to the spindle, being adjacent to the gear 9 both as will be understood, rotating in the space between the bearings 4 and 5. In adjacent faces of the gear 9 and disk 13 are rabbets 14 and 15 respectively to receive the divided band 16 of some suitable resilient or compressible material such for instance as leather. This band is divided or split and is caused to closely hug or embrace the gear 9 and coöperating disk 13.

The leather band 16 is held in gripping engagement with said gear 9 and disk 13 in some convenient manner as by means of the practically similar split clamping bands 17, one clamping band 17 encircling the leather band 16 where the same fits in the groove or rabbet 14 and the other clamping band 17 inclosing said leather band where it enters the rabbet or groove 15. As the two split bands 17 are the same in construction a detailed description of one will apply to the other. Said split metallic band 17 as shown comprises two duplicate sections or semi-circular segments, one of which is connected with a block 18 and the other with a block 19 at the ends thereof. One end of the other section of said band 17 is connected with the block 20, while the other end thereof is connected with the block 21. The ends of the sections of said split band 17 may be offset and soldered in notches in the inner surfaces of the several blocks 18, 19, 20 and 21. The blocks 18 and 19 have interiorly plain holes to receive screws 22, while the blocks 20 and 21 have threaded holes to receive the threaded portions of said screws.

It will be assumed that the side portions of the leather band 16 are in the rabbets 14 and 15 as shown in Fig. 1, that the two bands 17 fit around the circumference of the leather band 16 and that the several screws 22, of which there are four have been tightened to cause the two metallic bands 17 to draw the leather band 16 in firm engagement with the gear 9 and the disk 13. This is a simple construction for non-vibratingly transferring the effect of the gear 9 to the spindle 6, the consequence being that when the gear 11 is rotated the spindle 6 will through the intermediate parts be driven in a uniform manner and can through the customary driver impart like movement to the work.

What I claim is:

1. The combination of a spindle, an element rotative with the spindle, a driver for the spindle rotative with respect thereto, and resilient means for transferring power from the driver to said element to rotate the latter and provided with means for holding the same in rigid and against slipping relation with both said driver and said element.

2. The combination of a spindle, a driver for the spindle rotative with respect thereto, and shock absorbing means for transferring power from the driver to said spindle and provided with means for maintaining said shock absorbing means in rigid and against slipping relation with both the driver and the element.

3. The combination of a spindle, a disk rotative with the spindle, a gear rotative with respect to the spindle, and a resilient shock absorbing band in gripping circumferential engagement with the gear and the disk.

4. The combination of a spindle, an element fastened to said spindle, a driver for the spindle rotative with respect thereto, and a resilient power transferring member in non-slipping engagement with the driver and the element.

5. The combination of a spindle, a disk rotative with said spindle, a rotary gear loose with respect to the spindle and having a toothed and a plain portion, and a resilient band in gripping engagement with the plain portion of the gear and the disk.

6. The combination of a spindle, a disk fastened to said spindle, a gear loosely supported by the spindle, the gear and disk being adjacent and having rabbets in their adjacent faces, and a leather band set into the rabbets and in clamping engagement with the bodies of said rabbets.

7. The combination of a spindle, a disk rotative with said spindle, a gear rotative with respect to the spindle and coaxial with the disk, the gear having a toothed peripheral portion and a plain peripheral portion, and a shock absorbing band in gripping engagement with the peripheral plain portion of the gear and the peripheral portion of the disk.

8. The combination of a spindle, a disk fixed to and rotative with said live spindle, a gear loose on and rotative with respect to the spindle, a leather band surrounding the peripheries of the gear and the disk, and divided metallic band means for clamping the leather band to the gear and the disk.

9. The combination of a spindle, a gear supported by and rotative with respect to the spindle, a second gear in mesh with the first gear, a disk fastened to the spindle for rotation therewith, and shock absorbing means for transferring the effect of the gear to the disk and provided with means for holding the same in clamped relation with both the gear and the disk.

In testimony whereof I affix my signature in presence of two witnesses.

BENGT M. W. HANSON.

Witnesses:
W. M. STORRS,
C. M. GELLERT.